Oct. 3, 1961  R. L. BRACE ET AL  3,002,819
APPARATUS FOR TESTING FUELS
Filed Feb. 20, 1958  5 Sheets-Sheet 1
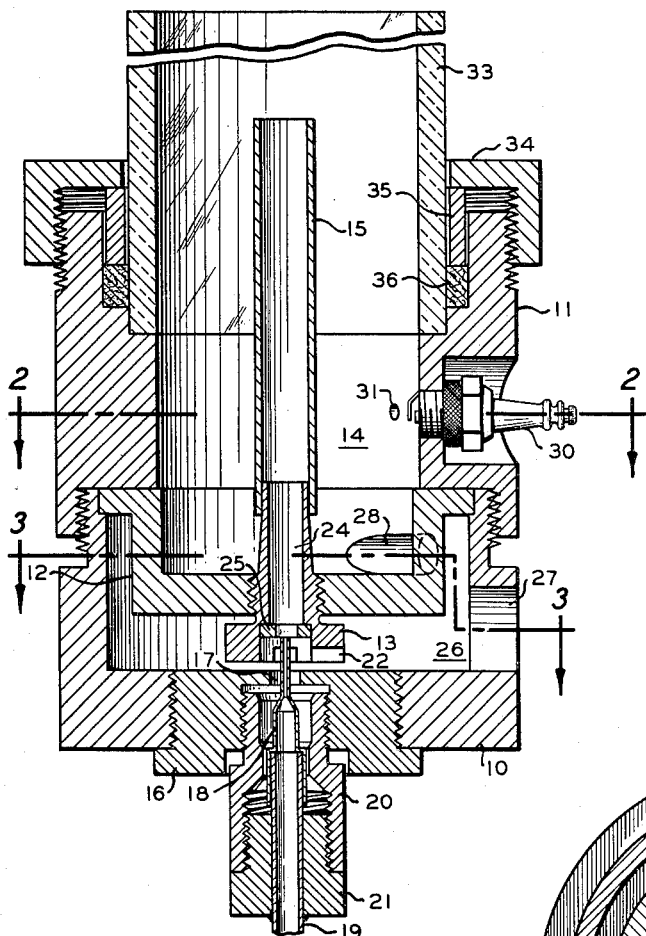
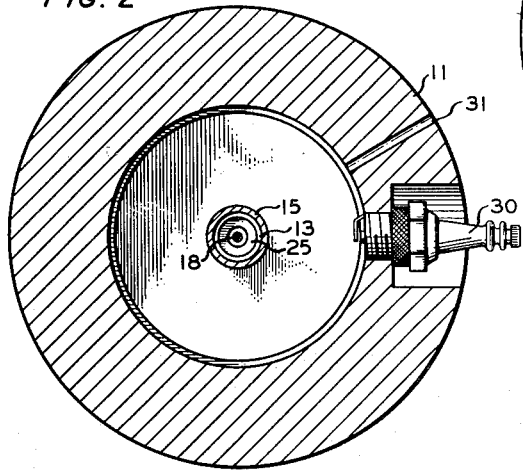
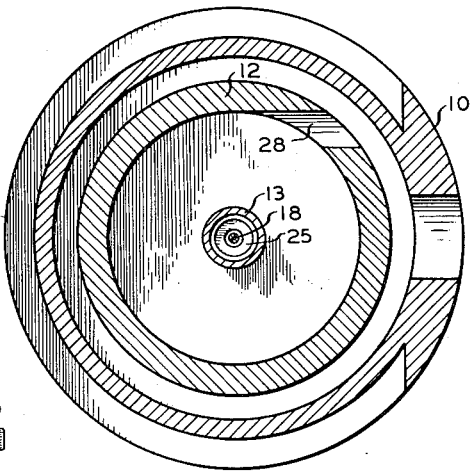
INVENTORS
R.L. BRACE
R.M. SCHIRMER
BY Hudson & Young
ATTORNEYS

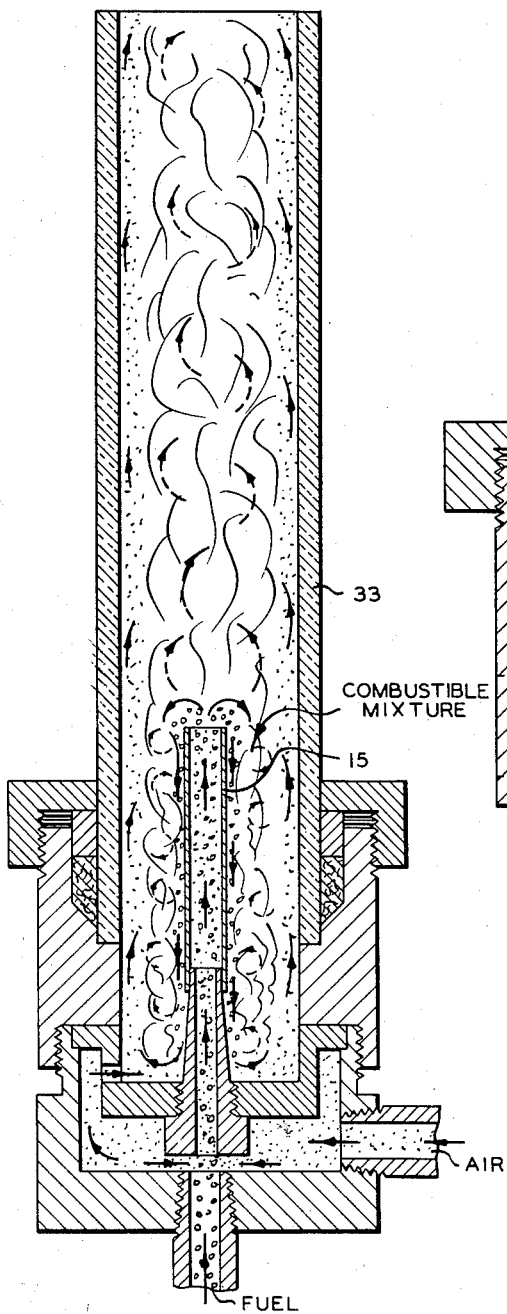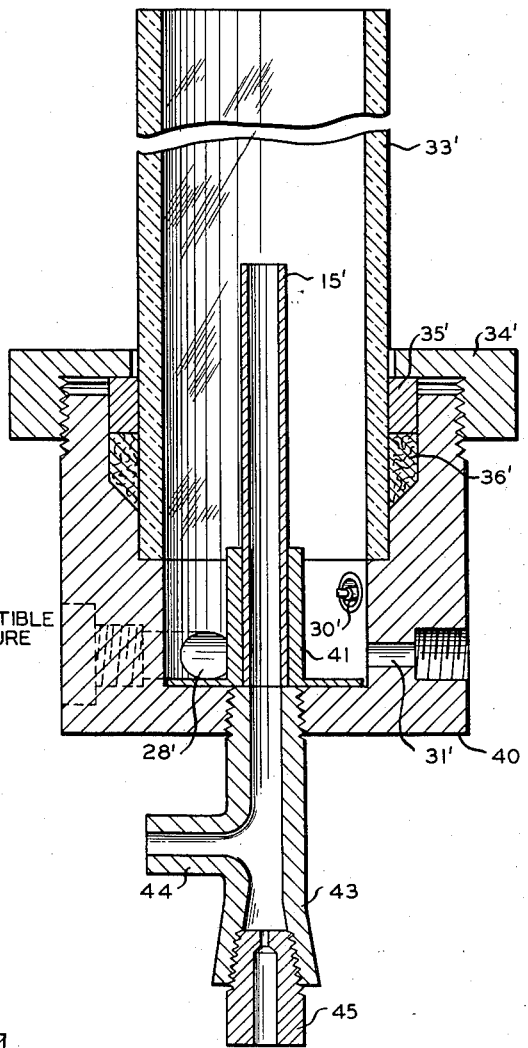

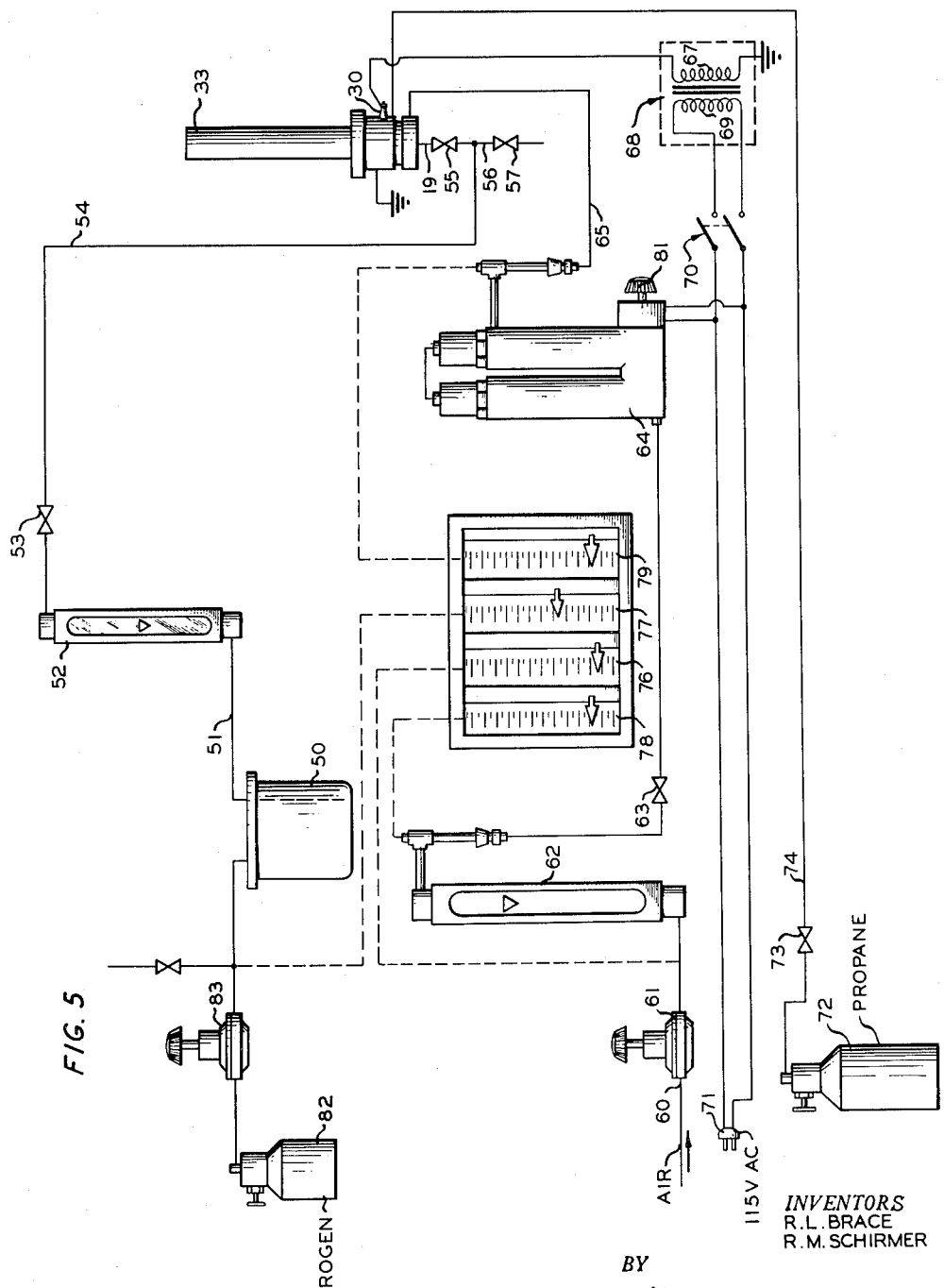

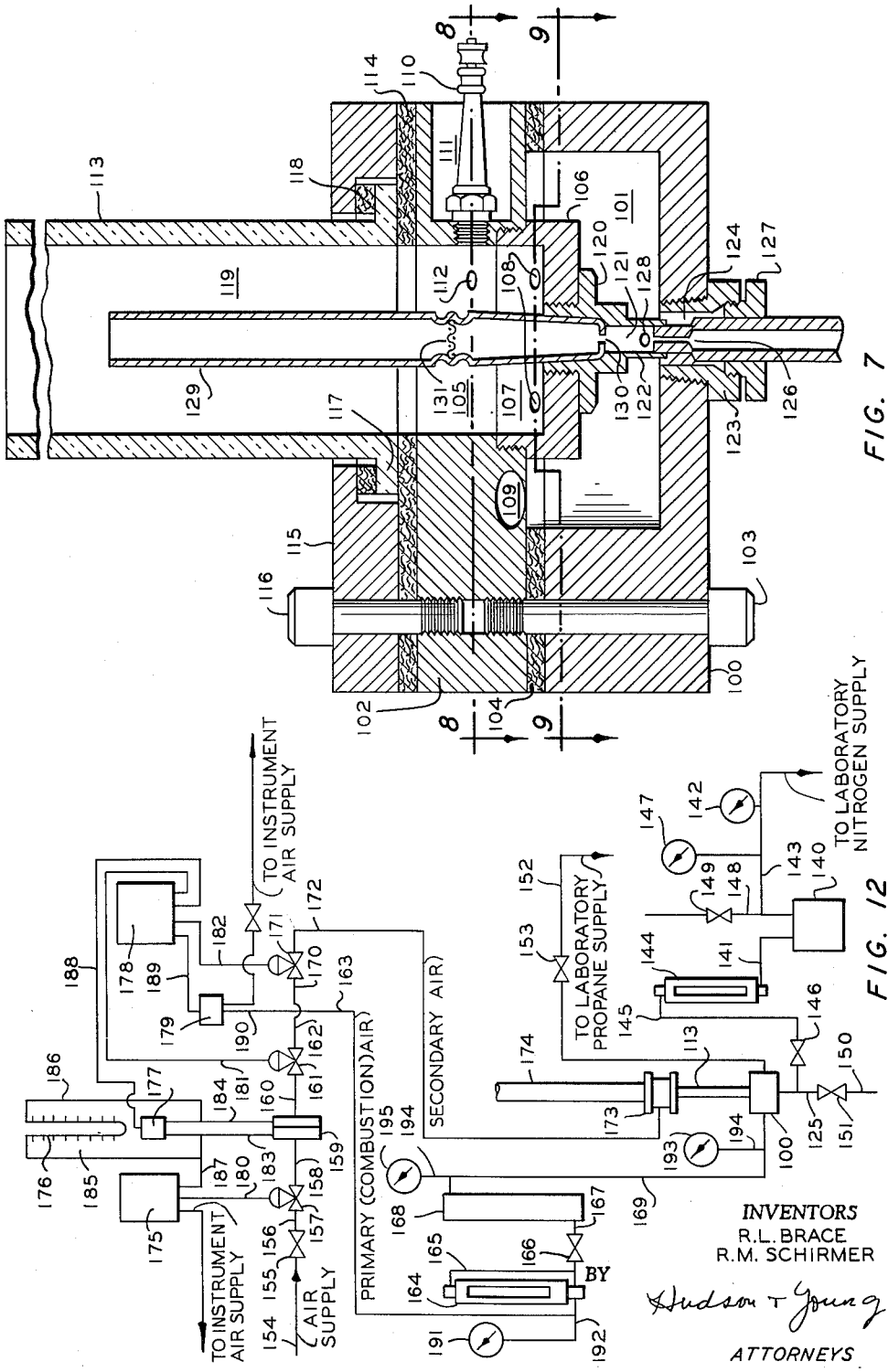

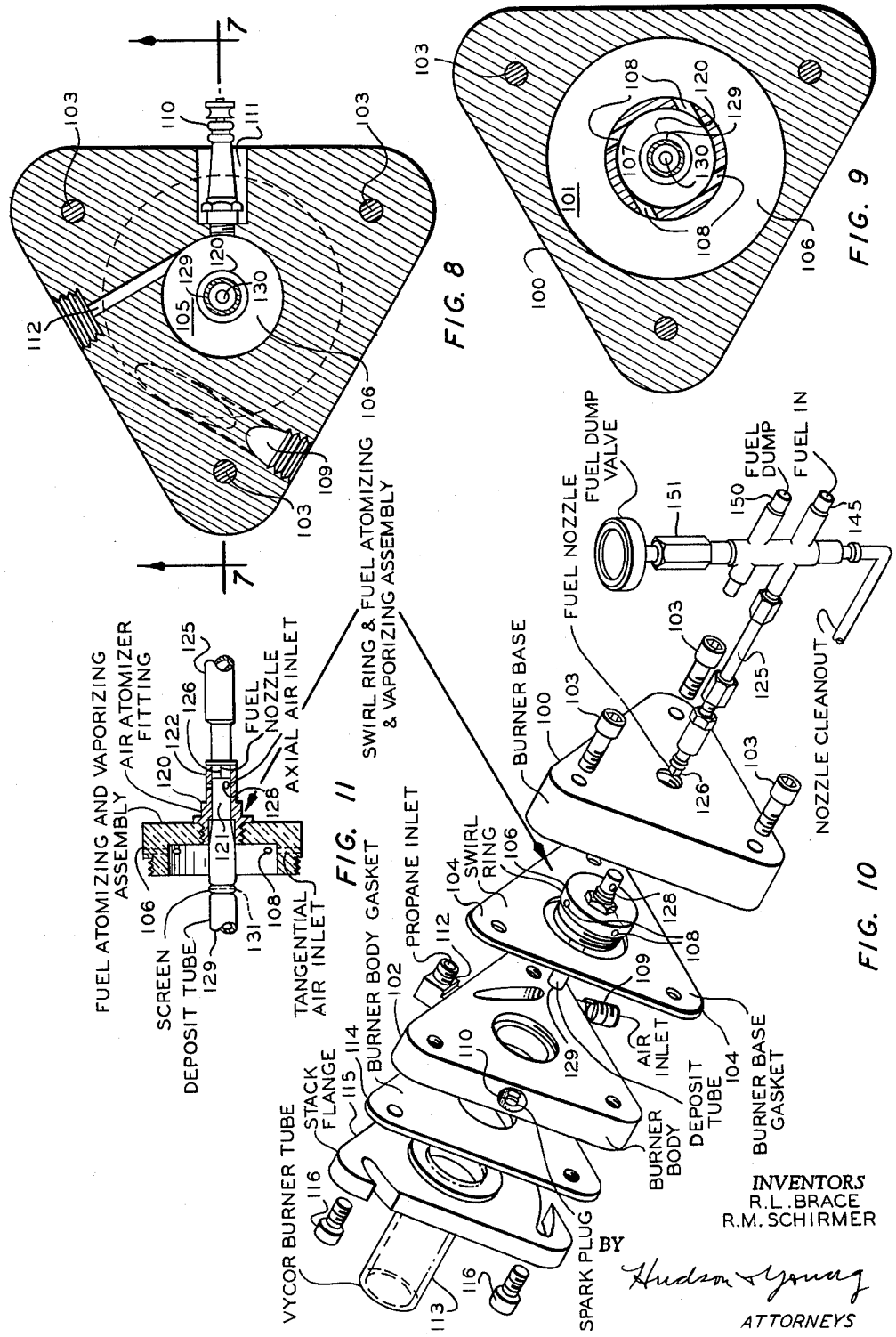

United States Patent Office 3,002,819
Patented Oct. 3, 1961

3,002,819
APPARATUS FOR TESTING FUELS
Robert L. Brace, Santa Clara, Calif., and Robert M. Schirmer, Bartlesville, Okla., assignors to Phillips Petroleum Company, a corporation of Delaware
Filed Feb. 20, 1958, Ser. No. 716,427
15 Claims. (Cl. 23—253)

This invention relates to apparatus for determining the combustion cleanliness of fuels. In one aspect, this invention relates to apparatus for determining the carbon deposition of fuels in a combustion zone. In another aspect, this invention relates to apparatus for determining the thermal instability of fuels in fuel distribution systems. In another aspect, this invention relates to an improved burner.

This application is a continuation-in-part of application Serial No. 475,936, filed December 17, 1954, now U.S. 2,845,334.

Although jet engines can be operated with fuels having various characteristics, the engine performance is definitely a function of the properties of the particular fuel chosen. One important factor in judging the quality of the fuel is the tendency of the fuel to form deposits of carbonaceous material in the combustion chamber. Another important factor in judging the quality of the fuel is the tendency of the fuel to form deposits of gums and/or resins in the fuel distribution system. One common procedure for determining the combustion cleanliness of a fuel involves the use of smoke lamps. However, it has been found that the results by these smoke lamps are often not too reliable. Another method of determining the combustion cleanliness of the fuel involves burning a sample of the fuel in a full scale or bench scale apparatus. Unfortunately, this method requires elaborate and expensive test set-ups, large samples of the fuel to be tested, an enormous supply of compressed air, and lengthy periods of time so that this method leaves something to be desired. Furthermore, there are no known laboratory methods for simultaneously determining both the carbon deposition tendency and fuel instability characteristics of a fuel.

The present invention relates to a novel burner which can be constructed on a small scale to test the combustion cleanliness of liquid fuels. This burner approximates combustion in a full scale jet engine and provides a reliable indication of the combustion cleanliness of the tested fuel. The burner is particularly useful for test purposes because it is capable of being operated throughout a wide range of combustion processes from essentially complete diffusion to complete premix types of combustion. This burner is particularly useful in determining the combustion cleanliness of a jet engine fuel because the amount of carbon deposited, the character of the carbon deposited, the degree of flame luminosity and the amount of smoke produced can readily be observed. Also, the burner apparatus of this invention is particularly useful in determining the combustion cleanliness of a fuel with respect to thermal instability resulting in the deposition and collection of gum and/or resins in the fuel distribution system.

The apparatus of this invention comprises a liquid fuel burner in the form of an elongated cylindrical combustion chamber into which fuel and air are supplied at one end and the combustion products are exhausted from the second end. The liquid fuel is introduced axially through a tube extending into the inlet end of the tubular combustion chamber. This inlet tube is positioned such that the axis thereof is coaxial with the axis of the combustion chamber. A jet-type flow nozzle can be located in the upstream end of the fuel tube to aid in discharging the fuel through the tube into the combustion chamber; however, a fuel nozzle is not necessary. A portion of the combustion supporting air enters the combustion chamber in a direction generally tangential to the side wall thereof through one or more spaced ports adjacent to the inlet end of the chamber. The remainder of the combustion air is introduced into the fuel tube to assist in passing the fuel into the combustion chamber. The liquid fuel is ignited initially by suitable means such as by passing a gaseous fuel into the combustion chamber across a spark ignition device.

Accordingly, it is an object of this invention to provide a burner suitable for evaluating fuels as to their combustion cleanliness. Another object is to provide a method and apparatus for evaluating fuels as to their combustion cleanliness with respect to carbon deposition in the combustion zone.

Another object is to provide apparatus for evaluating fuels as to their combustion cleanliness with respect to thermal instability in the deposition of gums and/or resins in the fuel distribution system.

Another object is to provide apparatus for simultaneously evaluating the effect of hydrocarbon structure, volatility, and the presence of gum and additives on the quality of fuels.

Another object of this invention is to provide a reliable apparatus for evaluating the combustion cleanliness characteristics of fuels with a minimum expenditure of fuel and time.

Another object of this invention is to provide a laboratory apparatus of evaluating the combustion cleanliness of fuels wherein the results obtained compare favorably with the actual results obtained in the combustion of said fuel in a full scale jet engine.

Another object is to provide apparatus for testing fuels useful in a jet engine.

Another object is to provide apparatus which can be used for the burning of liquid fuels throughout the range of premix to diffusion type combustion processes.

Other objects, advantage and features of this invention should become apparent from the following detailed description, taken in conjunction with the accompanying drawings, in which:

FIGURE 1 is a longitudinal sectional view of a first embodiment of the combustion apparatus of this invention;

FIGURE 2 is a sectional view taken along line 2—2 in FIGURE 1;

FIGURE 3 is a sectional view taken along line 3—3 in FIGURE 1;

FIGURE 4 is a longitudinal sectional view of a second embodiment of the combustion apparatus of this invention;

FIGURE 5 is a schematic presentation of one embodiment of the control apparatus employed to introduce fuel and air into the combustion apparatus of this invention for test purposes;

FIGURE 6 is a schematic representation of the combustion process which takes place in the apparatus of this invention;

FIGURE 7 is a longitudinal sectional view of a third embodiment of the combustion apparatus of this invention taken along line 7—7 in FIGURE 8;

FIGURE 8 is a sectional view taken along line 8—8 in FIGURE 7;

FIGURE 9 is a sectional view taken along line 9—9 in FIGURE 8;

FIGURE 10 is an exploded isometric view of the embodiment of FIGURE 7;

FIGURE 11 is a longitudinal sectional view of the swirl ring and fuel atomizing and vaporizing assembly shown in FIGURE 10; and FIGURE 12 is a schematic representation of a second embodiment of the control apparatus employed to introduce fuel and air into the combustion apparatus of this invention for test purposes.

Referring now to the drawing in detail and to FIGURES 1, 2, and 3, in particular, there is shown a burner which comprises an annular housing 11 which is threaded to a base plate 10. A support plate 12 is positioned within base 10 in spaced relation therewith and attached at its periphery between base 10 and housing 11. An elongated hollow screw 13 is threaded into the center portion of plate 12 so as to extend into the combustion chamber 14. A hollow cylindrical deposit tube 15 is attached to the upper end of screw 13 in a removable manner. Tube 15 can simply be wedged onto screw 13, as illustrated, or a more rugged threaded connection can be used, if desired. A plug 16, having a central opening 17 therein, is threaded into base 10. A fuel nozzle 18 is mounted on a fuel tube 19 and positioned so as to extend through opening 17 in plug 16. A sleeve 20 is threaded into plug 16 to enclose fuel nozzle 18. A plug 21 is fitted about fuel tube 19 and threaded into sleeve 20.

The lower surface of screw 13 is spaced from the upper surface of plug 16. In addition, a plurality of radial passages 22 is formed in the head of screw 13 to communicate with the central passage 24 therein. A washer 25 is fitted into the lower portion of passage 24 to form an orifice, and the upper end of fuel nozzle 18 extends into closely spaced relation therewith. A first passage 27 is formed in base 10 to receive an air supplying conduit, not shown in FIGURE 1. A passage 28 is formed in the side wall of plate 12 to introduce air from chamber 26 into combustion chamber 14 in a direction tangential to the interside wall of plate 12. If desired, additional passages 28 can be formed in plate 12 in spaced relation with the illustrated passage 28.

A spark plug 30 is threaded into the sidewall of housing 11. A passage 31 is formed in the sidewall of housing 11 adjacent spark plug 30 so that a gaseous fuel, such as propane, can be introduced into the combustion chamber and ignited by spark plug 30.

An elongated hollow cylindrical burner tube 33 is fitted into housing 11 and secured in place by a cap 34, which is threaded to the upper portion of housing 11. Cap 34 forces a sleeve member into engagement with packing material 36, which is positioned between tube 33 and housing 11. When the burner of FIGURE 1 is employed for test operations, it is desired that tube 33 be formed of transparent material, such as Vycor, in order that the combustion process can be observed visually.

In operation of the burner shown in FIGURES 1, 2, and 3, hydrocarbon fuel enters through fuel tube 19 into fuel nozzle 18 from which said fuel is sprayed through the orifice in washer 25 into central passage 24 and thus into deposit tube 15. The diameter of the internal passage of fuel nozzle 18 is substantially less than the internal diameter of central passage 24. Air for combustion of the fuel is supplied through passage 27 in base plate 10 into chamber 26 where the air so supplied is divided into tangential air entering combustion zone 14 through tangential passages 28 and axial air entering central passage 24 and deposit tube 15 through radial passages 22. Combustion is initiated by the combustion of a light hydrocarbon gas, such as propane, entering combustion chamber 14 through tangential passage 31. An electrical spark from spark plug 30 ignites the gaseous hydrocarbon fuel. After the fuel first entering through supply pipe 19 and finally through deposit tube 15 is ignited, the introduction of gaseous hydrocarbon through tangential passage 31 is discontinued. The fuel entering through supply pipe 19 is atomized by fuel nozzle 18 and vaporized by axial air entering through radial passages 22 assisted by the heat of combustion in combustion zone 14 surrounding deposit tube 15. Gums and resins formed due to the thermal instability of the fuel are deposited on the inner walls of deposit tube 15. Carbon resulting from the combustion of the fuel in combustion zone 14 is deposited on the outer surfaces of deposit tube 15. After a predetermined length of time, the introduction of fuel is discontinued and deposit tube 15 is removed from combustion chamber 14 and weighed in order to determine the total deposits of carbon and gum and/or resins. The external deposits of carbon on deposit tube 15 are removed and the tube is reweighed in order to obtain the weights of the internal and the external tube deposits.

FIGURE 4 shows a modified form of the burner of FIGURE 1 wherein corresponding parts are designated by like primed reference numerals. The combustion supporting air is introduced partially through a passage 28' which enters a base housing 40 in a direction tangential to the inner wall thereof. Propane is supplied through a passage 31' disposed adjacent spark plug 30'. Deposit tube 15' is inserted in a support member 41 which rests upon housing 40. A T-shaped coupling 43 is threaded to housing 40 to introduce fuel and air into deposit tube 15'. One arm 44 of coupling 43 is adapted to be connected to an air supplying conduit, and a fuel nozzle 45 is threaded into the second form of coupling 43. Otherwise, the burner of FIGURE 4 is substantially the same as the burner illustrated in FIGURES 1, 2, and 3.

In FIGURE 5, there is illustrated suitable apparatus which can be employed to supply fuel and air in a controllable manner to the combustion apparatus of this invention. The liquid fuel to be tested is positioned in a container 50, having an outlet conduit 51 therein. Nitrogen, under pressure, is supplied from a tank 82 through a pressure-regulating valve 83 to the surface of the liquid fuel in container 50 to force the fuel through conduit 51. The fuel passes from conduit 51 through a flowmeter 52, a valve 53, a conduit 54, and a valve 55 to the fuel nozzle of the test burner. A vent conduit 56, having a valve 57 therein, communicates with conduit 54. The combustion supporting air is supplied from a suitable source, not shown, through a conduit 60, a pressure-regulating valve 61, a flowmeter 62, a valve 63, a heating chamber 64, and a conduit 65 to the test burner. One terminal of spark plug 30 is connected to one end terminal of the secondary winding 67 of an ignition transformer 68. The second end terminal of transformer winding 67 is grounded, as is the test burner. The primary winding 69 of transformer 68 is connected through a switch 70 to a plug 71 which is adapted to be inserted into a conventional source of alternating current. The terminals of plug 71 are also connected to air heater 64 to energize heating coils therein. Propane is supplied from a container 72 through a valve 73 and a conduit 74 to the propane inlet passage of the test burner.

The air pressure at the outlet of pressure-regulating valve 61 is measured by a pressure indicator 76, and the nitrogen pressure at the outlet of pressure regulator 83 is measured by a pressure indicator 77. The temperature of the air at the outlet of flowmeter 62 is measured by a temperature indicator 78, and the temperature of the air at the outlet of heater 64 is measured by a temperature indicator 79.

In the operation of the test burner, the air flow is first adjusted to the desired rate by manipulation of valve 63. The temperature of the air is regulated by adjusting a thermostat 81 on air heater 64. Propane is then introduced into the burner by opening valve 73. The propane is ignited by closing switch 70 momentarily. When the propane is burning to produce a stable flame, valve 53 is opened to pass the test fuel into the burner at the desired rate. The propane flow is then cut off. The test fuel is burned for a given length of time. At the end of this period, the flows of fuel and air are cut off and the deposit tube removed from the combustion chamber. This deposit tube is cooled and weighed to determine the mass of carbon deposit on the surface thereof.

The tangential introduction of air into the combustion chamber results in a helical flow of gases around the periphery of the combustion chamber. The flow resulting from the Hilsch tube effect through the center of the combustion chamber and along the outside of the deposit tube aids the mixing of fuel and air in the combustion zone by carrying the fuel particles from the discharge end of the fuel tube back into the zone of combustion surrounding the tube. This effect is illustrated schematically in FIGURE 6. The back flow of fuel and air outside the deposit tube increases the retention time of the fuel-air mixture in the combustion zone and thereby reduces the loss of unburned fuel from the discharge end of the combustion chamber. For this reason, the burner is useful on a large scale as well as for fuel combustion cleanliness tests. The heat supplied by the combustion of the fuel outside the deposit tube tends to vaporize the liquid fuel supplied through the deposit tube such that the liquid fuel is substantially vaporized by the time it leaves the deposit tube. This is the desirable operating procedure. The flow of fuel and air through the deposit tube tends to cool the tube and thereby promotes the deposit of carbon thereon.

In testing a fuel for its combustion cleanliness characteristics, it is often desirable to perform a series of runs with different fuel-air ratios. The amount of carbon deposited in a given time, ten minutes for example, is compared with the corresponding deposits from other fuels burned under the same conditions. Excellent results have been obtained by using a burner which is only a fraction of the size of a full scale engine, and which uses only a fraction of the fuel required in a full scale engine. For example, in a fuel test program, the inside diameter of tube 33 of FIGURE 1 was approximately 1.25 inches and the length of tube 33 was approximately 9 inches. Deposit tube 13 was 2 inches long, and had an outside diameter of 0.25 inch and a wall thickness of 0.01 inch. The air introduced tangentially comprised approximately 52 percent, based on opening area. The measured carbon deposits correlated well with tests made using full size engines.

In FIGURES 7-11, there is shown another modified form of the burner of FIGURE 1. This burner comprises a trigonal-shaped burner base 100, having a cylindrical air chamber 101 centrally located therein opened through one of the parallel surfaces of the trigonal-shaped base. Open air chamber 101 is closed by trigonal-shaped burner body 102 of the same dimensions as trigonal-shaped burner base 100 attached to burner base 100 by means of machine screws 103. Burner base gasket 104 of the same dimensions as burner base 100 and burner body 102 is located between burner body 102 and burner base 100 to provide a seal and prevent the leakage of air from air chamber 101. Burner body 102 is provided with a cylindrical passage, having an axis corresponding to the axis of trigonal-shaped burner body 102, which is also the axis of cylindrical air chamber 101 in burner base 100. Swirl ring 106 closes cylindrical passage 105 at the juncture of burner body 102 with burner base 100 by screw attachment so that swirl ring 106 extends into air chamber 101 and is in spaced relation therewith. Swirl ring 106 is provided with a cylindrical passage 107 of the same diameter as cylindrical passage 105 and coaxial therewith. Cylindrical passage 107 is in open communication with cylindical passage 105. Communication between air chamber 101 and cylinder passage 107 and cylindrical passage 105 is provided by four tangential air inlets 108 located adjacent the closed end of swirl ring 106 and disposed so as to be tagential with the inner walls of cylindrical passage 107 in swirl ring 106.

Passage 109 is provided in burner body 102 for the introduction of air into air chamber 101. Air inlet passage 109 enters air chamber 101 at a direction which is tangential with the cylindrical walls of air chamber 101 and has an axis which is disposed at a slant from the horizontal so as to enter air chamber 101 at the juncture of burner body 102 with burner base 100.

Spark plug 110 is threaded into the sidewall of burner body 102 in cylindrical chamber 111 with the electrical contact of spark plug 110 located in cylindrical passage 105. Passage 112 is provided in burner body 102 for the introduction of a gaseous fuel, such as propane, at a direction which is tangential with the cylindrical wall of cylindrical passage 105.

An elongated hollow cylindrical burner tube 113, having a diameter corresponding to the diameter of cylindrical passages 105 and 107, is attached to burner body 102 separated by burner body gasket 114. Burner tube 113 is held in place by stack flange 115 attached to burner body 102 by machine screws 116. Stack flange 115 forces a flange member 117 provided on the opened end of burner tube 113 into engagement with burner body 102 separated by burner body gasket 114. Flange member 117 is separated from stack flange 115 by packing material 118. Preferably, burner tube 113 is formed of a transparent material, such as Vycor, in order that the combustion process taking place in combustion chamber 119 can be visually observed. Combustion chamber 119 is defined by the cylindrical passage within burner tube 113 and includes cylindrical passage 105 in burner body 102 and cylindrical passage 107 in swirl ring 106.

A plug 120, having a central opening 121, therein, is threaded into the closed end of swirl ring 106 and sleeve 122 which is an integral part of plug 120 is disposed within cylindrical chamber 101. Plug 123, having a central opening 124 therein, is threaded into the closed end of cylindrical chamber 101 into burner base 100 in vertical alignment with plug 120. Fuel tube 125, having a fuel nozzle 126 in its opened end, is wedged into opening 121 in sleeve 122 through opening 124 in plug 123. Plug 127 is fitted about fuel tube 125 and threaded into passage 124 and plug 123 to hold fuel tube 125 in place and to prevent leakage of pressure from cylindrical chamber 101. Three axial air inlets are provided in sleeve 122 for the passage of air from cylindrical chamber 101 into passage 121 in plug 120.

An elongated cylindrical deposit tube 129 is fitted in a removable manner into opening 121 in plug 120 so as to extend into burner tube 113 in combustion chamber 119 along the axis of burner tube 113, cylindrical passage 105 and cylindrical passage 107. Deposit tube 129 is tapered at its lower end so as to be removably engaged with a tapered portion of passage 121 in plug 120. Orifice 130 is provided in the lower end of deposit tube 129. Transfer screen 131 of 30 mesh is located near the lower end of deposit tube 129 and held in place by ridges in the wall of deposit tube 129. Preferably, deposit tube 129 and screen 131 are constructed of stainless steel; however, other high temperature metals can also be used.

The burner shown in FIGURES 7-11 can be operated with the exhaust of burner tube 113 opened to the atmosphere or, as shown in FIGURE 12, an exhaust stack can be attached to the open end of burner tube 113 for removal of combustion gases from the immediate area of the burner. Also, as shown in FIGURE 12, secondary air can be injected into the exhaust stack to cool the combustion gases.

In operation, air is introduced into air chamber 101 through air inlet 109 and proportioned into tangential and axial components by means of swirl ring 106, tangential air inlets 108 and axial air inlets 128. Tangential air entering through inlets 108, based on hole area, comprises 75 percent of the air flow introduced through air inlet 109. Fuel is introduced through fuel pipe 125 and atomized by discharge from fuel nozzle 126. Axial air and vaporized fuel flow through orifice 130 into deposit tube 129 where complete vaporization of the air-atomized fuel is accomplished within the deposit tube 129 prior to entry of the fuel-axial air mixture into the combustion zone. Due to the helical pattern of the flow through the combustion chamber 119, there is a back flow established along the axis, similar in principle to the Hilsch tube phenomenon. This induced free vortex flow pattern establishes a seat for the flame in the low velocity region of flow reversal near the closed end of combustion zone 119 adjacent swirl ring 106. The pattern of flow in combustion zone 119 is shown in the drawing of FIGURE 6. The ignition of the fuel-axial admixture from deposit tube 129 is accomplished by spark plug 110 and ignited propane gas discharged through jet tangential inlet 112 as described in the previous embodiments.

The fuel-rich mixture, after leaving deposit tube 129, is swept down over the outer surface of deposit tube 129 by the flow of hot exhaust gases coming down the axis of burner tube 113. Heating of the fuel-rich mixture by these exhaust gases plus heating from the flame results in pyrolysis, and carbon so formed migrates to the surface of deposit tube 129 which is cooled by the fuel vaporization taking place internally. The deposit of pyrolytic carbon on the outer surface of deposit tube 129 is a measure of the carbon deposition of the fuel entering fuel pipe 125. Gums existing in the liquid fuel as well as resins formed as a result of thermal instability of the fuel are deposited on the inner wall of deposit tube 129. Thus, deposit tube 129 functions to collect deposits both of the type occurring in fuel atomizing and fuel distribution systems as well as deposits of the type which collect in the combustion zone of an internal combustion engine.

In FIGURE 12, there is illustrated another embodiment of apparatus which can be employed to supply fuel and air in a controllable manner to the burner apparatus of this invention for determining the combustion cleanliness of the liquid fuel being tested. The liquid fuel to be tested is contained in fuel tank 140, having an outlet conduit 141. Nitrogen under pressure is supplied through nitrogen pressure regulator 142 and conduit 143 to the surface of the fuel in fuel tank 140 to force fuel through outlet conduit 141, fuel rotometer 144, conduit 145, and control valve 146 into fuel pipe 125 connected to burner base 100, as shown in FIGURE 7. Precision dial manometer 147 is attached to conduit 143 for measuring nitrogen pressure. Excess nitrogen can be bled from fuel tank 140 through conduit 148 and nitrogen bleed valve 149. Fuel can be dumped from burner base 100 through conduit 150 and dump valve 151 attached to conduit 125.

Ignition of the fuel is accomplished by ignited propane introduced through conduit 152 and propane valve 153 into burner base 100.

Air, supplied from a suitable source, not shown, flows through conduit 154, valve 155, conduit 156, motor valve 157, conduit 158, orifice 159, conduit 160, motor valve 161, conduit 162, conduit 163, rotometer 164, conduit 165, valve 166, conduit 167, air heater 168 and conduit 169 into burner base 100. A portion of the air is removed from conduit 162 by means of conduit 170 and passed through motor valve 171 and conduit 172 to air manifold 173 attached to the exhaust end of burner tube 113 for cooling the exhaust gases removed through exhaust discharge 174. Metered air at constant pressure and constant flow rate is obtained through the use of automatic pressure controller 175, differential manometer 176, differential pressure cell 177, automatic flow rate controller 178, and differential pressure cell 179. Automatic pressure controller 175 regulates the positioning of motor valve 157 through conduit 180. Automatic flow rate controller 178 regulates the opening of motor valve 161 through conduit 181 and the opening of motor valve 171 through conduit 182. Differential pressure cell 177 is connected to the opposite sides of orifice 159 by conduits 183 and 184. Each leg of differential manometer 176 is connected to conduits 183 and 184 by conduits 185 and 186, respectively, and conduit 185 is also connected to automatic pressure controller 175 by conduit 187. Differential pressure cell 177 is connected to automatic flow rate controller 178 by conduit 188. Differential pressure cell 179 is connected to automatic flow rate controller 178 by conduit 189 and to the juncture of conduits 162, 163 and 170 by conduit 190. Primary air pressure is obtained from precision dial manometer 191 connected to conduit 163 by conduit 192. Pressure at the burner base is obtained from pressure gauge 193 connected to conduit 169 by conduit 194. Temperature of the air at the outlet of electric heater 168 is measured by thermocouple 194 and obtained from temperature indicator 195.

The operation of the test apparatus shown in FIGURE 12 is described in the following specific example.

EXAMPLE

Deposit tubes 129 are first cleaned by spraying inside and out with a solvent mixture made of 40 percent ethyl acetate, 30 percent denatured alcohol, 25 percent ortho dichlorobenzene, and 5 percent butyl alcohol. After the solvent has been removed by blasting with air from a spray gun, deposit tubes 129 are then air dried and preburned in the burner apparatus, using propane fuel for a period of thirty seconds. After cooling, the cleaned, preburned deposit tube is weighed and inserted into the burner in a manner as shown in FIGURE 7.

Air flow to the burner is adjusted to the desired condition of temperature and pressure and the fuel tank is filled with the liquid fuel to be tested and pressurized with nitrogen. Gaseous propane is admitted to combustion zone 119 and ignited by means of a spark from spark plug 110. Liquid fuel is admitted into deposit tube 129 by opening fuel rate control valve 146. When the liquid fuel is burning in a stable manner, the propane flow is cut off by closing valve 153.

The combustion cleanliness test is of a duration necessary to burn the desired weight of fuel, after which time deposit tube 129 is removed, cooled and weighed. The total deposit weight is obtained by difference from the final weight of the deposit tube and its original weight. The external surface of deposit tube 129 is wiped clean after weighing and the tube is reweighed to obtain the weight of internal deposits by difference. External deposits are obtained by difference between total and internal deposits. Smoke spot samples are obtained with a Bacharach smoke tester during the course of the deposition test and their density measured by means of a Densichron densitometer.

The combustion cleanliness of several test fuels was determined using the burner described in FIGURES 7–11 and the test apparatus described in FIGURE 12. The specification for these fuels is reported in Table I. The combustion cleanliness of these fuels was evaluated under two conditions: one condition simulating those existing in jet engines of early design and some current rather conventionally designed engines and conditions simulating those existing in jet engines of advanced design. The burner conditions selected for the first type operation comprise a flow of 10 feet per second linear velocity through the burner tube 113 (based on mass air flow) and an inlet air temperature of 250° F. The burner conditions selected for the second type operation comprised a flow of 30 feet per second velocity and an inlet air temperature of 500° F. In these tests, 0.5 pound of fuel was burned at a fuel-air ratio of 0.07. The data obtained in these tests are reported in Table II wherein total deposits, internal deposits, external deposits, and smoke percent black are reported.

Table I

Physical and chemical properties—Test fuels

| | Refined kerosene (Bayol D) | Heavy alkylate (Soltrol) | Catalytically cracked kerosene | G 368 plus 0.02% weight duPont FOA No. 2 0.003% weight DMD | Aromatic kerosene | Refined aromatic kerosene | Hydrogenated aromatic kerosene | Hydrogenated cat. cracked kerosene |
|---|---|---|---|---|---|---|---|---|
| Existent gum, total, mg./100 ml | 0.7 | 0.2 | 8.4 | 16.2 | 24.8 | 0.6 | | |
| Pentane insolubles in above | 0.3 | | | | | | | |
| WADC water tolerance rating | 1 | 1 | 4 | 4 | 4 | 1 | | |
| Peroxide number | 0.0 | <0.01 | 0.04 | 0.13 | 0.16 | <0.01 | | |
| Potential gum, total, mg./100 ml | 1.1 | 2.6 | 24.0 | 26.3 | 121.8 | 0.8 | | |
| Pentane insolubles in above | 0.4 | | | | | | | |
| Distillation, °F.: | | | | | | | | |
| Ibp | 384 | 442 | 402 | 425 | 432 | 368 | 385 | 362 |
| 5% | 408 | 446 | 458 | 455 | 454 | 372 | 444 | 449 |
| 10% | 414 | 447 | 468 | 473 | 466 | 373 | 456 | 468 |
| 20% | 421 | 449 | 477 | 478 | 479 | 375 | 468 | 477 |
| 30% | 427 | 452 | 484 | 482 | 487 | 376 | 477 | 484 |
| 40% | 433 | 454 | 489 | 487 | 494 | 377 | 485 | 489 |
| 50% | 438 | 457 | 493 | 493 | 500 | 378 | 492 | 494 |
| 60% | 444 | 460 | 497 | 498 | 507 | 379 | 499 | 499 |
| 70% | 450 | 464 | 502 | 503 | 514 | 381 | 507 | 505 |
| 80% | 458 | 470 | 509 | 508 | 523 | 383 | 515 | 513 |
| 90% | 469 | 480 | 518 | 518 | 534 | 387 | 526 | 522 |
| 95% | 480 | 492 | 525 | 528 | 542 | 392 | 535 | 529 |
| End point | 497 | 503 | 535 | 538 | 555 | 414 | 545 | 545 |
| Composition, percent vol.: | | | | | | | | |
| Paraffins | 51.0 | 77.1 | 16.0 | | 8.3 | 0.3 | | |
| Olefins | 3.1 | 3.7 | 19.2 | | 12.6 | 4.0 | | |
| Naphthenes | 43.3 | 17.0 | 29.5 | | 10.2 | 7.4 | | |
| Aromatics | 2.6 | 2.2 | 35.3 | | 68.9 | 88.3 | | |
| Flash point, °F | 172 | 202 | 180 | 178 | 204 | 160 | | |
| Freezing point, °F | −30.3 | <−40 | −16.8 | −17.1 | −28.8 | −23.4 | | |
| Sulfur, total, percent weight | 0.002 | 0.005 | 0.343 | 0.342 | 0.68 | 0.006 | | |
| Sulfur, mercaptan percent weight | 0.0005 | <0.001 | <0.001 | <0.001 | 0.002 | <0.001 | | |
| Viscosity, cs. at— | | | | | | | | |
| −30° F | 13.53 | 59.43 | Solid | Solid | 38.10 | Solid | | |
| 100° F | 1.83 | 2.95 | 2.45 | 2.46 | 2.38 | 1.12 | | |
| 210° F | 0.85 | 1.13 | 1.03 | 1.03 | 0.98 | 0.60 | | |
| IP smoke point, mm | 26.5 | 27.0 | 10.3 | 10.7 | 6.0 | 7.0 | | |
| Aniline point, °F | 176.6 | 199.3 | 123.2 | 123.6 | 44.0 | +1 | | |
| Bromine number | <0.1 | 2.4 | 21.0 | 24.7 | 22.0 | 2.5 | | |
| Net heat of combustion, B.t.u./lb | 19,872 | 20,040 | 19,086 | 19,144 | 18,453 | 18,545 | | |
| Corrosion | 1 | 3 | 0 | 0 | 0 | 1 | | |
| Gravity, API | 48.4 | 49.4 | 34.0 | 34.0 | 23.4 | 27.6 | 25.0 | 35.0 |
| Refractive index at 20° C | 1.4371 | 1.4364 | 1.4829 | 1.4829 | 1.5249 | 1.5060 | | |
| Dielectric constant at 20° C | 2.071 | 2.071 | 2.278 | 2.278 | 2.480 | 2.397 | | |

Table II

Combustion cleanliness data on test fuels

| Fuel description | Condition—10 FPS velocity—250° F. inlet air | | | Smoke percent black | Condition—30 FPS velocity—500° F. inlet air | | | Smoke percent black |
|---|---|---|---|---|---|---|---|---|
| | Total deposits mg. | Internal deposits mg. | External deposits mg. | | Total deposits mg. | Internal deposits mg. | External deposits mg. | |
| Refined kerosene (Bayol D) | 3.2 | 0.0 | 3.2 | 8.0 | 2.1 | 0.4 | 1.7 | 2.0 |
| | 1.8 | 0.0 | 1.8 | 8.0 | 1.7 | 0.3 | 1.4 | 1.5 |
| | 1.3 | 0.0 | 1.3 | 9.0 | 1.9 | 0.6 | 1.3 | 1.0 |
| Average | 2.1 | 0.0 | 2.1 | 8.3 | 1.9 | 0.4 | 1.5 | 1.5 |
| Heavy alkylate (Soltrol) | 2.0 | 0.0 | 2.0 | 3.0 | 1.8 | 0.4 | 1.4 | 1.0 |
| | 1.2 | 0.0 | 1.2 | 11.0 | 1.3 | 0.5 | 0.8 | 1.0 |
| | 0.9 | 0.0 | 0.9 | 17.0 | 1.6 | 0.4 | 1.2 | 0.5 |
| Average | 1.4 | 0.0 | 1.4 | 10.3 | 1.6 | 0.4 | 1.1 | 0.8 |
| Catalytically cracked kerosene | 52.9 | 7.2 | 45.7 | 60.0 | 28.0 | 6.7 | 21.3 | 25.0 |
| | 47.1 | 13.0 | 34.1 | 73.0 | 30.6 | 8.3 | 22.3 | 25.0 |
| | 63.2 | 9.0 | 54.2 | 67.0 | 30.4 | 8.2 | 22.2 | 26.0 |
| Average | 54.4 | 9.7 | 44.7 | 66.7 | 29.7 | 7.7 | 21.9 | 25.3 |
| Catalytically cracked kerosene plus [1] | 55.2 | 14.7 | 40.5 | 69.0 | 39.9 | 15.0 | 24.9 | 40.0 |
| | 61.4 | 17.9 | 43.5 | 60.0 | 43.6 | 13.4 | 30.2 | 55.0 |
| | 68.9 | 11.1 | 57.8 | 61.0 | 47.7 | 17.4 | 30.3 | 57.0 |
| Average | 61.8 | 14.6 | 47.3 | 63.3 | 43.7 | 15.3 | 28.5 | 50.7 |
| Aromatic kerosene | 252.3 | 12.6 | 239.7 | 89.0 | 112.3 | 25.3 | 87.0 | 83.0 |
| | 169.1 | 10.6 | 158.5 | 96.0 | 100.2 | 25.9 | 74.3 | 93.0 |
| | 207.1 | 12.4 | 194.7 | 92.0 | 101.2 | 22.0 | 79.2 | 83.0 |
| Average | 209.5 | 11.9 | 197.6 | 92.3 | 104.6 | 24.4 | 80.2 | 86.3 |
| Refined aromatic kerosene | 85.0 | 1.4 | 83.6 | 71.0 | 52.1 | 0.3 | 51.8 | 79.0 |
| | 70.5 | 1.6 | 68.9 | 61.0 | 48.0 | 0.4 | 47.6 | 67.0 |
| | 78.6 | 1.6 | 77.0 | 72.0 | 48.4 | 0.3 | 48.1 | 67.0 |
| Average | 78.0 | 1.5 | 76.5 | 68.0 | 49.5 | 0.3 | 49.2 | 71.0 |

[1] Catalytically cracked kerosene plus 0.02% weight duPont FOA No. 2 plus 0.0003% duPont DMD.

*Table II—Continued*

| Fuel description | Condition—10 FPS velocity—250° F. inlet air | | | Smoke percent black | Condition—30 FPS velocity—500° F. inlet air | | | Smoke percent black |
|---|---|---|---|---|---|---|---|---|
| | Total deposits mg. | Internal deposits mg. | External deposits mg. | | Total deposits mg. | Internal deposits mg. | External deposits mg. | |
| Hydrogenated aromatic kerosene | 135.9 | 0.4 | 135.5 | 88.0 | 62.1 | 2.1 | 60.0 | 94.0 |
| | 171.3 | 2.1 | 169.2 | 97.0 | 59.7 | 1.0 | 58.7 | 100.0 |
| | 160.3 | 1.4 | 158.9 | 97.0 | 59.8 | 3.8 | 56.0 | 95.0 |
| Average | 155.8 | 1.3 | 154.5 | 94.3 | 60.5 | 2.3 | 58.2 | 96.3 |
| Hydrogenated catalytically cracked kerosene | 62.0 | 3.0 | 59.0 | 69.0 | 20.3 | 1.6 | 18.7 | 13.0 |
| | 44.9 | 1.9 | 43.0 | 56.0 | 20.3 | 1.6 | 18.7 | 19.0 |
| | 69.6 | 1.1 | 68.5 | 67.0 | 21.5 | 1.3 | 20.2 | 21.0 |
| Average | 58.8 | 2.0 | 56.8 | 64.0 | 20.7 | 1.5 | 19.3 | 17.7 |

Although the apparatus of this invention has been described using air as the gaseous oxidant, other gaseous oxidant mixtures can also be used, including oxygen itself, in place of air, particularly when the burner apparatus of this invention is used for the purpose of generating power. Ordinarily, when the burner apparatus is used for determining the combustion cleanliness of test fuels, air is used as the oxidant so as to more closely approximate actual conditions existing in various internal combustion engines, particularly jet engines, but also including reciprocating-type engines. The division of the combustion air supplied to the burner apparatus of this invention is such that the larger proportion is supplied as tangential air and the smaller proportion is supplied as axial air into the deposit tube. Various divisions between tangential and axial air can be made; however, ordinarily, the air supplied as tangential air will comprise in the range of from 50 to 90 percent of the total air flow.

Cylindrical deposit or fuel tube 15, 15', or 129 can be constructed of various lengths; however, the length of said fuel tube is always greater than the internal diameter of the combustion zone in order to develop the backflow of gases along the external surface of said fuel tube.

While the invention has been described in conjunction with the present preferred embodiments, the invention obviously is not limited thereto.

We claim:

1. A burner for liquid fuels comprising a housing defining a cylindrical combustion chamber, a solid cylindrical tube extending into said chamber from one end of said chamber and along the axis of said chamber, said housing being provided with at least one first passage which extends from a region exterior of said housing to said combustion chamber adjacent said one end, said first passage entering said combustion chamber in a direction generally tangential to the side wall of said chamber, and spark ignition means positioned in said combustion chamber outside said tube and adjacent said one end, said housing being provided with a second passage which extends from a region exterior of said housing to a region within said combustion chamber adjacent said spark ignition means.

2. The combination in accordance with claim 1 further comprising first means to supply a liquid fuel to be tested to said tube, second means to supply oxygen to said first passage, third means to supply a combustible gas to said second passage, and fourth means to apply a sparking potential to said spark ignition means.

3. The combination in accordance with claim 2 wherein said first means comprises a container adapted to contain a liquid fuel, means to apply pressure to said container to expel said fuel therefrom, and conduit means including a first flowmeter connected between said container and said tube; said second means comprises a source of air under pressure, and conduit means including a second flowmeter and a heating means connected between said source of air and said first passage; said third means comprises a source of a combustible gas, and conduit means connecting said source of combustible gas to said second passage; and said fourth means comprises a transformer, a source of alternating current connected in circuit with the primary winding of said transformer, and means connecting the secondary winding of said transformer to said spark ignition means.

4. A burner for liquid fuels comprising a housing defining a cylindrical combustion chamber, a solid cylindrical tube extending into said chamber from one end of said chamber and along the axis of said chamber, said housing being provided with at least one first passage which extends from a region exterior of said housing to said combustion chamber adjacent said one end, said first passage entering said combustion chamber in a direction generally tangential to the side wall of said chamber, spark ignition means positioned in said combustion chamber outside said tube and adjacent said one end, housing being provided with a second passage which extends from a region exterior of said housing to a region within said combustion chamber adjacent said spark ignition means, and means defining third and fourth passages communicating with the interior of said tube to supply fuel and oxidant to said combustion chamber through said tube.

5. A burner for liquid fuels comprising a housing defining a cylindrical combustion chamber closed at one end, a solid sleeve extending through said housing into said chamber at said one end in a direction along the axis of said chamber, a cylindrical tube removably secured to said sleeve and extending along the axis of said chamber within said chamber to form an extension of said sleeve, a base member secured to said housing adjacent said one end, and a fuel nozzle attached to said base and extending into said sleeve to introduce fuel into said sleeve and said tube, said housing having at least one first passage formed therein which extends from a region exterior of said housing to said combustion chamber adjacent said one end, said first passage entering said combustion chamber in a direction generally tangential to the side wall of said chamber, and said base being spaced from said housing to form a second passage from a region exterior of said housing to the interior of said sleeve.

6. A burner for testing the combustion cleanliness of a liquid fuel in terms of carbon deposits comprising a housing defining a cylindrical combustion chamber closed at one end, a solid sleeve extending through said housing into said chamber at said one end in a direction along the axis of said chamber, a cylindrical tube removably secured to said sleeve and extending along the axis of said chamber within said chamber to form an extension of said sleeve and disposed and adapted to receive carbon deposits from the combustion of said fuel in said combustion chamber and to be easily removed for weighing said deposits, a base member secured to said housing adjacent said one end, and a fuel nozzle attached to said base and extending into said sleeve to introduce fuel into said sleeve and said tube, said housing having at least one first passage formed therein which extends from a region exterior of said housing to said combustion chamber adjacent said one end, said first passage entering said combustion chamber in a direction generally tangential to the side wall of said chamber, and said base being spaced from said housing to form a second passage from a region exterior of said housing to the interior of said sleeve, said cylindrical combustion chamber being made in part of transparent material so that said combustion may be closely observed therethrough.

7. A burner for liquid fuels comprising a housing defining a cylindrical combustion chamber and an oxidant chamber surrounding the closed end of said cylindrical combustion chamber, a solid elongated cylindrical tube extending into said combustion chamber from the closed end of said combustion chamber along the axis thereof, inlet means for introducing liquid fuel into one end of said elongated cylindrical tube, means for introducing an oxidant into said oxidant chamber, means for dividing said oxidant in said oxidant chamber into a first portion and into a second portion, inlet means for introducing said first portion of oxidant into said combustion chamber in a direction generally tangential to the side wall of said combustion chamber, inlet means for introducing said second portion of oxidant into one end of said elongated cylindrical tube, and an ignition means in said combustion chamber for igniting said liquid fuel.

8. A burner for liquid fuels comprising a housing defining a cylindrical combustion chamber and a cylindrical oxidant chamber surrounding a part of the combustion chamber at the closed end thereof, a solid elongated cylindrical tube extending into said combustion chamber from the closed end of said combustion chamber along the axis thereof, inlet means for introducing liquid fuel into one end of said elongated cylindrical tube, nozzle means located in said liquid fuel inlet means for atomizing said liquid fuel, inlet means for introducing an oxidant into said oxidant chamber, inlet means for introducing a first portion of the oxidant in said oxidant chamber into said combustion chamber in a direction generally tangential to the side wall of said combustion chamber, inlet means for introducing a second portion of the oxidant in said oxidant chamber into one end of said elongated cylindrical tube, and an ignition means in said combustion chamber outside said tube for igniting said liquid fuel.

9. The combination in accordance with claim 8 further comprising means for attaching said elongated cylindrical tube in a manner so as to be readily removable from said combustion chamber.

10. The combination in accordance with claim 9 wherein the wall of said combustion is made in part of a transparent material.

11. The combination in accordance with claim 10 wherein said housing is generally trigonal in shape and removably separable into several parts and the part of said combustion chamber made of a transparent material is readily removably separable from said housing.

12. The combination in accordance with claim 11 wherein said elongated cylindrical tube has a metal screen disposed therein adjacent the inlet end thereof in a direction transverse to the axis of said tube.

13. The combination in accordance with claim 8 wherein said inlet means for introducing said first portion of oxidant into said combustion chamber in a direction generally tangential to the side wall of said combustion chamber is located at a point between the closed end of said combustion chamber and the discharge end of said elongated cylindrical tube extending into said combustion chamber.

14. An apparatus for testing the combustion cleanliness properties of liquid fuels, said apparatus comprising, in combination, a burner having a housing defining a cylindrical combustion chamber and a cylindrical air chamber surrounding a part of the combustion chamber at the closed end thereof, a solid elongated cylindrical deposit tube extending into said combustion chamber from the closed end of said combustion chamber along the axis thereof and removable therefrom, a metal screen disposed within the inlet end of said deposit tube in a direction transverse to the axis of said tube, fuel inlet means for introducing liquid fuel to be tested into one end of said deposit tube, nozzle means located in said fuel inlet means for atomizing said fuel to be tested, air inlet means for introducing air into said air chamber, inlet means for introducing a first portion of air in said air chamber into said combustion chamber in a direction generally tangential to the side wall of said combustion chamber, inlet means for introducing a second portion of air in said air chamber into one end of said deposit tube, and ignition means in said combustion chamber outside said tube for igniting said test fuel; exhaust means for removing exhaust gases from said combustion chamber; means for supplying air to said air inlet means of said burner at a constant metered rate and regulated temperature; means for heating said air supplied to said air inlet means of said burner; means for supplying the fuel to be tested to said burner at a constant metered rate; and means for supplying air to said exhaust means for cooling said exhaust gases.

15. An apparatus for testing the combustion cleanliness properties of a liquid fuel, said apparatus comprising, in combination, a burner having a cylindrical combustion chamber and a removable solid deposit tube extending into said combustion chamber from one end of said chamber along the axis thereof, means for supplying air to said burner at a constant metered rate, said means providing for introducing a first portion of said air tangentially into the combuston chamber of said burner and a second portion of said air into the inlet end of said deposit tube, means for supplying fuel to be tested to said burner at a constant metered rate, and ignition means positioned in said combustion chamber outside said tube for ignitiing said fuel to be tested.

References Cited in the file of this patent

UNITED STATES PATENTS

| | | |
|---|---|---|
| 2,451,625 | Marshall | Oct. 19, 1948 |
| 2,517,015 | Mock | Aug. 1, 1950 |
| 2,518,025 | Knight | Aug. 8, 1950 |
| 2,602,292 | Buckland | July 8, 1952 |
| 2,805,598 | Sprague | Sept. 10, 1957 |
| 2,845,334 | Brace | July 29, 1958 |

OTHER REFERENCES

Young: "Proc. Am. Petrl. Inst., sec. III, 29M, pp. 47–9, 1949.